UNITED STATES PATENT OFFICE.

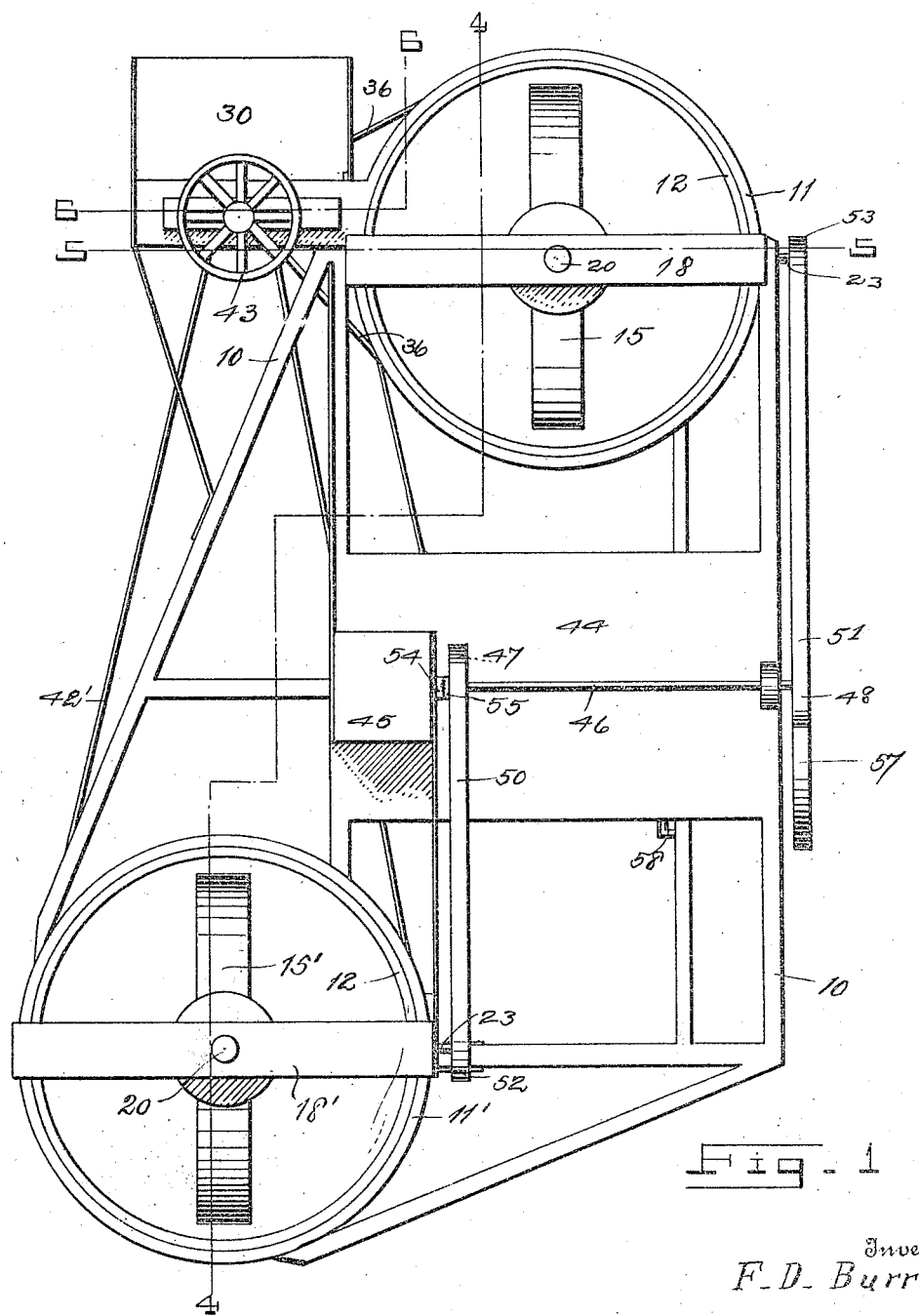

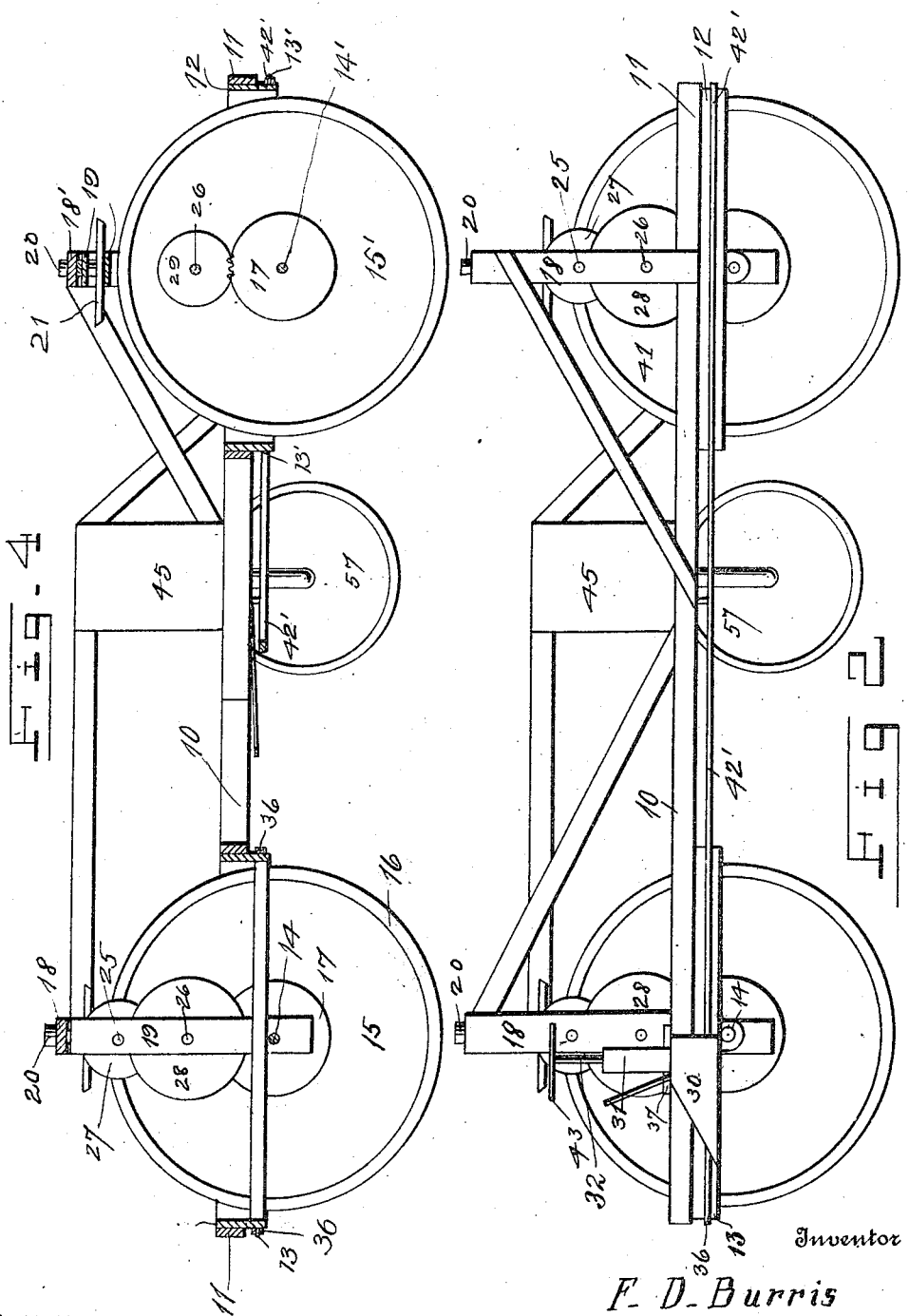

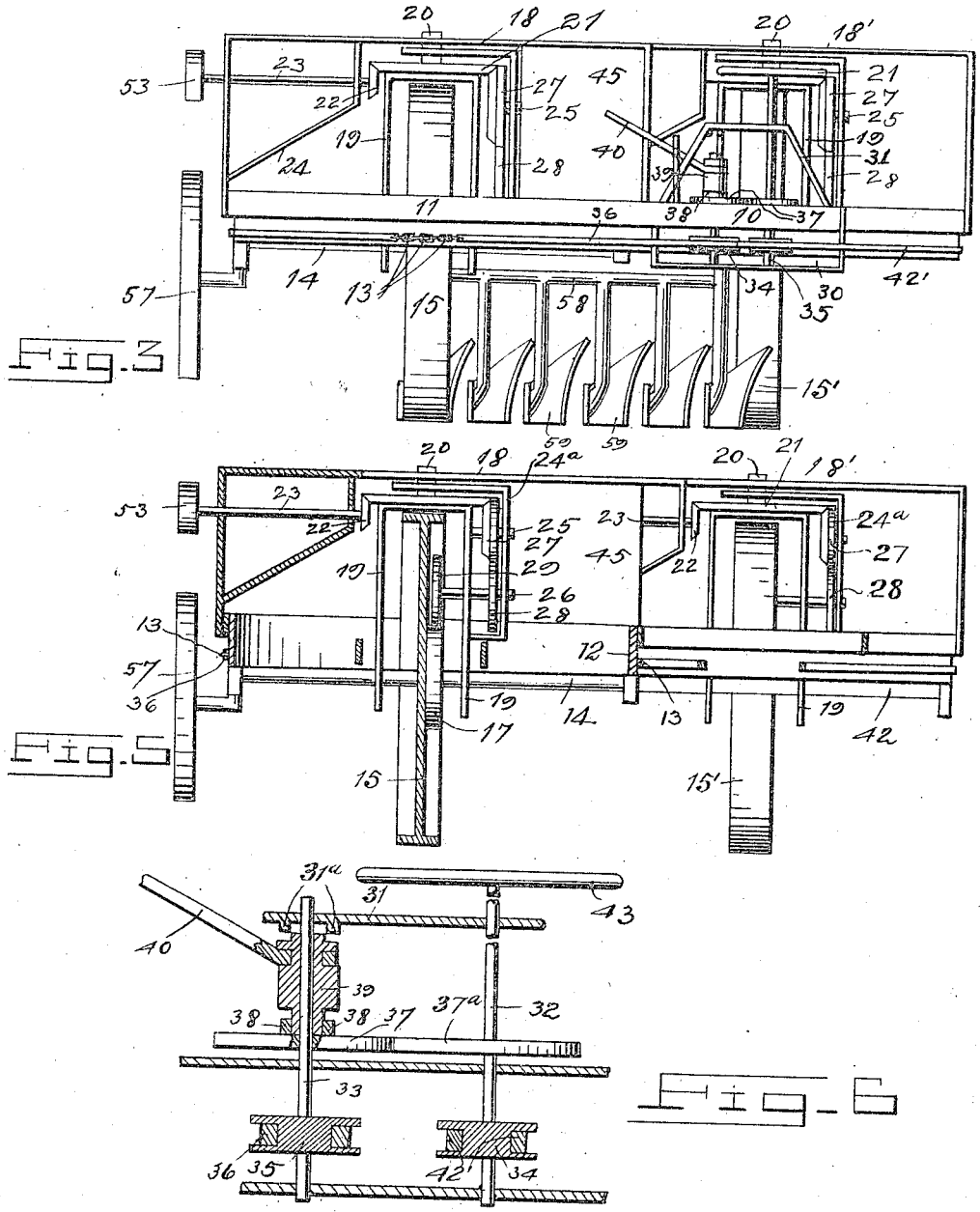

FRANK DELBERT BURRIS, OF WAUKEGAN, ILLINOIS.

MOTOR-TRUCK.

1,139,635.     Specification of Letters Patent.     Patented May 18, 1915.

Application filed November 2, 1911. Serial No. 658,268.

*To all whom it may concern:*

Be it known that I, FRANK D. BURRIS, a citizen of the United States, residing at Waukegan, in the county of Lake and State of Illinois, have invented certain new and useful Improvements in Motor-Trucks, of which the following is a specification.

My invention relates to motor trucks, and has for its object to provide a motor truck having certain new and improved features to be hereinafter fully described and claimed. One of these improved features consists in providing the truck with two traction wheels arranged diagonally to each other at either end of the frame, and in providing further a steering apparatus whereby one only of said wheels may be turned or both of them at one time and in opposite directions, as may be desired. By this arrangement both wheels may be manipulated when it is necessary to turn a corner or reverse the truck, and if desirable under such circumstances a very short turn can be made. When the truck is traveling in a generally straight course the steering apparatus preferably operates upon the forward traction wheel alone as it is neither necessary or desirable to use both wheels in steering in such cases. The steering gear of my improved motor truck is so constructed that when the front wheel alone is used in steering, the rear wheel may be disconnected from the steering apparatus and its fork locked in a predetermined position.

Another object of the invention is to provide driving mechanism that will permit the traction wheels to be turned at various angles without interference.

Another object of the invention is to provide a novel arrangement of the wheels of the truck by means of which it can be made to travel easily over uneven ground. Slight inequalities in the surface over which the vehicle travels will not throw either of the traction wheels out of contact with the ground. For this reason the driving power is utilized to the fullest extent.

The invention has for further objects such other new and improved constructions in motor driven trucks as will be hereinafter described and claimed.

The invention is illustrated, in a preferred embodiment, in the accompanying drawings, wherein—

Figure 1 is a plan view of a motor truck; Fig. 2, a side elevation thereof; Fig. 3, a rear elevation thereof showing a number of plow shares secured to the under side of the frame illustrating its use as a motor driven plow. Fig. 4, a vertical section on line 4—4 of Fig. 1; Fig. 5, a cross-section on line 5—5 of Fig. 1; and Fig. 6, a fragmentary sectional view on line 6—6 of Fig. 1.

Like characters of reference designate like parts in the several figures of the drawings.

Referring to the drawings, 10 designates the frame of the truck. The frame is formed at the rear end with a ring 11 in which is fitted a movable ring 12 which latter extends below the ring 11 and is provided with the sprocket teeth 13. Extending across the ring 12 is an axle shaft 14 on which is mounted the preferably broad-tired traction wheel 15. The wheel 15 is provided with a fork 19, the ends of which engage the axle shaft 14 and which is provided with a stud 20 turning in a bearing in the yoke frame 18 secured to the truck frame 10.

The stud 20 carries a bevel gear 21 which meshes with a bevel pinion 22 on the end of a shaft 23 carried in bearings on the yoke frame 18, and a bracket 24. The bevel gear 21 also meshes with the beveled portion of a combined bevel and plane pinion 27 which is carried on a shaft 25 supported by the fork 19 and a bracket 24ª. Such an arrangement of the pinions 22 and 27 permits the turning of the wheel substantially 175° in either direction from its normal position without the pinion 27 coming in contact with bevel pinion 22. The plane portion of pinion 27 meshes with a gear 28 carried on a shaft 26 which also carries a gear 29 meshing with a gear 17 which is rigidly attached to the traction wheel 15.

At the forward end of the truck frame 10 is a stationary ring 11′, similar to the ring 11 at the rear of the truck, in which is fitted a movable ring 12′. Within the ring 12′ is mounted a traction wheel 15′, the fork of which bears in a yoke frame 18′. The means employed for pivotally mounting the forward traction wheel 15′ and the train of gears for driving the wheel may be exactly the same as the corresponding devices employed in connection with the rear traction wheel 15 and need not be separately described.

The truck is preferably provided with a platform 44 on which is mounted a motor 45 of any suitable character. A shaft 46 is arranged so that it may be connected or disconnected from the motor by means of a clutch 54, 55 of any preferred sort. The shaft 46 carries two sprockets 47, 48. A link belt 50 connects sprocket 47 with a sprocket 52 on the shaft 23 at the forward end of the machine. A similar link belt 51 connects sprocket 48 with a sprocket 53 on the shaft 23 at the rear end of the machine.

In the preferred construction of my truck the wheels 15, 15' are out of line with each other and the truck is provided with a third wheel 57 which is much less in diameter than the traction wheels and (having special reference to the use of the truck for a plow carriage) is so arranged as to run on a higher level than the wheels 15, 15'. The arrangement of the wheels in this manner enables the truck to be run over any inequality in the surface of the land without throwing either traction wheel out of contact with the ground. The truck simply tilts a little to one side or the other as the case may be.

In Fig. 3 of the drawings a number of plow shares are shown in connection with the truck illustrating its use as a motor driven plow for which it is very adaptable. The description of the truck in this connection will be brief as the arrangement and working parts of the plow structure is the subject-matter described and claimed in my co-pending application Serial No. 731,470, filed November 15, 1912, and will not be claimed in this application. In this figure of the drawings I have shown the truck carrying a number of plow shares 59 secured to a beam 58 on the underside of the truck frame. The rear wheel is arranged directly behind the outermost of the plow shares so as to travel in the furrow made thereby. The innermost of the plow shares is located a little to the left of the forward wheel so that the latter may travel in the furrow made by the outermost of the plow shares in a previous course around the field. This arrangement of the plow shares enables the wheels 15, 15' to travel on the same level while the land side wheel 57 runs on the unplowed land.

The rear end of the truck is preferably formed with a platform 30 on which the person controlling the machine may stand and a steering wheel 43 is provided, the wheel being carried on a shaft 32 mounted in a framework 31. Shaft 32 carries a sprocket wheel 34 and a chain 42' connects the sprocket 34 with the sprocket 13' on the ring 12' at the forward end of the truck.

Mounted in the framework 31 is a shaft 33 (Fig. 6) which has loosely mounted thereon the pinion 37 which meshes with a pinion 37ª rigidly mounted on the shaft 32. The shaft 33 carries a sprocket wheel 35 which is connected by means of a chain 36 with the sprocket 13 on the ring 12 at the rear end of the truck. Gear 37 is formed with ribs 38 and the shaft 33 is provided with a slidable locking block 39, manipulated by a handle 40, which block is formed at its lower end to fit within the ribs 38 on the gear 37 and at its upper end to fit within the ribs 31ª on the under side of frame 31. With the locking block in the position shown in Fig. 6 the gear 37 is locked to the shaft 33 and any movement of the steering wheel 43 simultaneously turns the traction wheels 15, 15' in opposite directions. Owing to the fact that it is difficult to hold steady the wheels used in steering a heavy vehicle, it is very difficult to follow a fixed course. For this reason my truck is preferably steered, where the course is relatively straight, by the forward wheel alone, which enables it to maintain a much straighter course than would be possible if both the front and rear wheels were used in steering. However, in order to do this the rear wheel must be disconnected from the steering apparatus, and is accomplished by raising the locking block 39 so that the gear 37 is freed from engagement with the shaft 33. By means of the engagement of the locking block with the ribs 31ª the shaft 33 is locked and thereby holds the rear wheel against rotation on its vertical axis. When it is desired to make a short turn the locking block is lowered so as to engage with the ribs 38 on the gear 37, which connects the rear wheel with the steering apparatus, then by turning the wheels to the proper angle and applying the power, the truck can make a very short turn.

While I have described my invention in a preferred embodiment, it will be readily understood that modifications might be made without departure from the invention. Therefore I do not limit myself to the particulars described and claimed except so far as they are made specific limitations in certain of the claims; my intention being to claim, both broadly and narrowly, whatever patentable novelty my invention may possess in view of the state of the art.

I claim:

1. In a truck the combination with a truck frame, of a pair of traction wheels one at each end of the frame and out of line with each other, a third wheel out of line with the other two wheels and adapted to run on a higher level, and means for driving said traction wheels.

2. In a truck the combination with a truck frame, of two traction wheels, one at each end of the frame and mounted in revoluble rings adapted to turn on vertical axes, a third wheel out of line with the other two wheels and adapted to run on a higher level, and means for simultaneously driving said traction wheels.

3. In a truck the combination with a truck frame, of forks pivoted to the front and rear end of the frame and adapted to turn on vertical axes, traction wheels in said forks, and a train of gears on the forks adapted to drive said wheels comprising, in each case, a bevel gear on the top of the fork, shafts on the frame having bevel gears meshing with the bevel gears on the forks, and means for simultaneously driving said shafts.

4. In a truck the combination with a truck frame, of a pair of forks pivoted to the front and rear end of the frame so as to stand out of line with each other and adapted to turn on vertical axes, traction wheels in said forks, trains of gears on the forks adapted to drive said wheels comprising, in each case, a bevel gear on the top of the fork, shafts on the frame having bevel gears meshing with the bevel gears on the forks, and means for simultaneously driving said shafts.

5. In a truck the combination with a truck frame, of a pair of revoluble rings arranged one at each end of the frame and out of line with each other, traction wheels provided with shafts mounted in said rings, forks engaging said shafts adapted to pivotally connect said rings to the frame so as to turn on vertical axes, trains of gears on the forks adapted to drive said wheels comprising, in each case, a bevel gear on the top of the forks, shafts on the frame having bevel gears meshing with the bevel gears on the forks, and means for simultaneously driving said shafts.

In testimony whereof I affix my signature, in the presence of two witnesses.

FRANK DELBERT BURRIS.

Witnesses:
JOHN D. POPE,
PAUL MACGUFFIN.